(12) United States Patent
Miller et al.

(10) Patent No.: US 9,355,370 B2
(45) Date of Patent: May 31, 2016

(54) SYSTEM AND METHOD FOR GENERATING LEGAL DOCUMENTS

(71) Applicants: Kenneth Scott Miller, Malibu, CA (US); Adam Hall, Reseda, CA (US)

(72) Inventors: Kenneth Scott Miller, Malibu, CA (US); Adam Hall, Reseda, CA (US)

(73) Assignee: iClosings.com, Inc., Santa Monica, CA (US)

( * ) Notice: Subject to any disclaimer, the term of this patent is extended or adjusted under 35 U.S.C. 154(b) by 337 days.

(21) Appl. No.: 13/922,154

(22) Filed: Jun. 19, 2013

(65) Prior Publication Data

US 2014/0025608 A1    Jan. 23, 2014

Related U.S. Application Data

(60) Provisional application No. 61/674,085, filed on Jul. 20, 2012.

(51) Int. Cl.
| | | |
|---|---|---|
| *G06N 5/00* | (2006.01) | |
| *G06F 1/00* | (2006.01) | |
| *G06N 99/00* | (2010.01) | |
| *G06Q 10/10* | (2012.01) | |
| *G06Q 50/18* | (2012.01) | |
| *G06F 17/24* | (2006.01) | |

(52) U.S. Cl.
CPC ............ *G06N 99/005* (2013.01); *G06F 17/248* (2013.01); *G06Q 10/10* (2013.01); *G06Q 50/18* (2013.01)

(58) Field of Classification Search
CPC ............ G06N 5/04; G06N 7/005; G06N 5/02
See application file for complete search history.

(56) References Cited

U.S. PATENT DOCUMENTS

| | | | |
|---|---|---|---|
| 2005/0022114 A1* | 1/2005 | Shanahan et al. ............. | 715/513 |
| 2008/0147790 A1* | 6/2008 | Malaney et al. ............... | 709/203 |
| 2012/0303558 A1* | 11/2012 | Jaiswal .......................... | 706/12 |

* cited by examiner

*Primary Examiner* — Stanley K Hill
*Assistant Examiner* — Kalpana Bharadwaj

(57) ABSTRACT

A system and method for the automated generation of documents for a legal transaction over a network using probabilistic prediction of customary usage. The predictions are generated by user experience, expert rules and machine learned classifiers based on user input of transaction data. The classifiers are constructed and tested on a partitioned dataset consisting of transaction data and legal document and clause selections in previous transactions. In one embodiment, such dataset is collected in a document management system.

20 Claims, 9 Drawing Sheets

SYSTEM 100

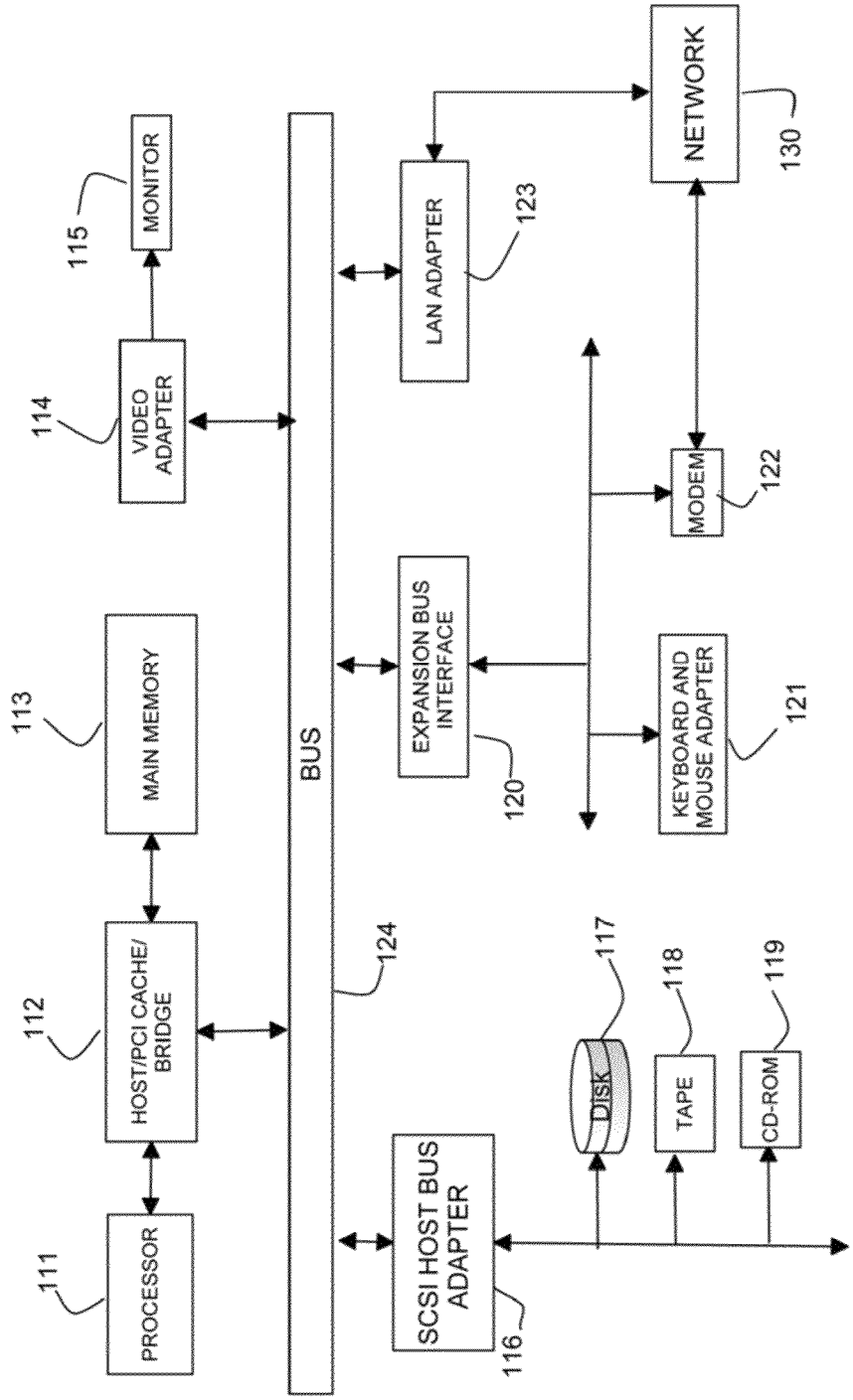

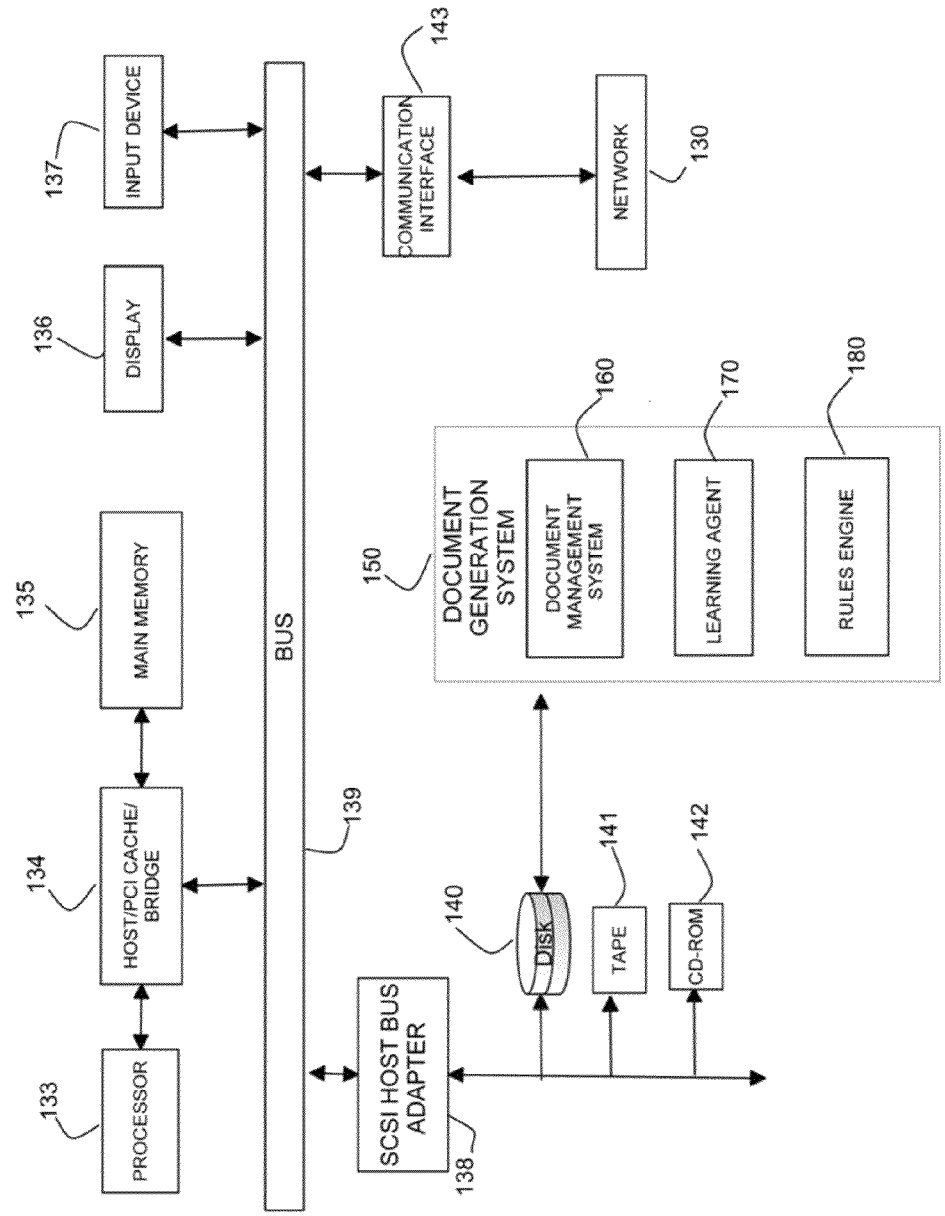

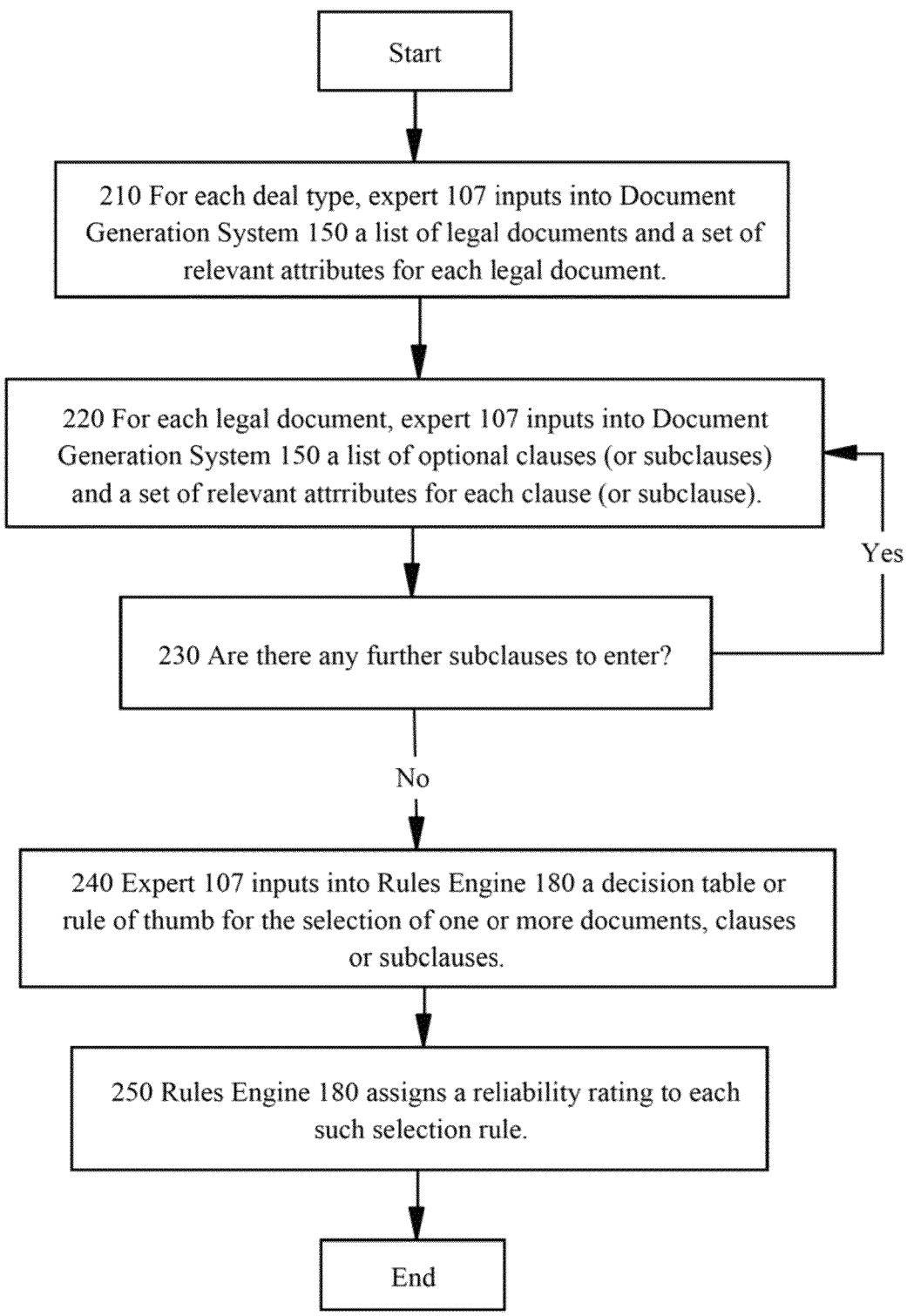

SELECTING LEGAL DOCUMENTS

LEARNING SELECTION RULES WITH LEARNING ALGORITHMS

SYSTEM AND METHOD FOR GENERATING LEGAL DOCUMENTS

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith.

U.S. provisional patent application 61/674,085 entitled "System and Method for the Generation of Documents based on Probabilistic Prediction of Customary Usage", naming Kenneth S Miller, et. al, as inventors, filed 20 Jul. 2012.

BACKGROUND

1. Field of the Invention

The present invention relates to automated document creation and more particularly to the creation of a set of suggested documents for a legal transaction using probabilistic prediction of customary usage based on supervised machine learning.

2. General Background and Related Art

Legal Documents

For consumers and small businesses, the need to select and draft legal documents often arises in connection the purchase or sale of property (real, personal, or intangible), businesses, and the making of a loan. The legal documents used in such transactions include deeds and other documents necessary to transfer title or create a lien on title, affidavits and certificates required by federal, state and local tax regulations, and documents that reduce, eliminate, or shift risk away from the party requiring the document. An example of the latter category of documents is an estoppel certificate certifying statements that the issuer may be legally precluded (i.e., estopped) from denying in subsequent transactions.

Except for routine transactions, such as the sale of stock in public companies and the sale and financing of residential property, the selection, the terms and clauses of legal documents have not been standardized in the United States. In non-routine transactions, the parties to the transaction typically agree, either implicitly or explicitly, to the use of those legal documents and clauses that are customary for the relevant circumstances. However, the parties themselves are usually not familiar with the customary document requirements. To minimize legal risk or liability exposure the parties often retain attorneys to identify and draft the necessary documents. While this approach is efficient for large complex transactions, it is often impractical for transactions involving modest sums. In other transactions, the parties may rely on closing agents, e.g., escrow companies, for the selection and preparation of the necessary legal documents. However, escrow companies (and in some cases real estate brokers) may be agents for all the transaction parties; and, therefore, cannot represent the completely independent interest of any party.

Parties wishing to independently select and prepare their own legal documents often consult self-help legal publications which often provide legal document forms and general "rules of thumb" (referred to herein as "selection rules") for completing the form. In some cases, the selection rules are simple and clear cut. However, many legal documents cannot be selected or completed with the aid of simple, well-known selection rules. First, many legal documents (or clauses within documents) are not commonly applicable and thus are not well covered, if at all, by self-help legal publications. Next, although there are legal documents that are often used, the legal literature may nonetheless advise that use of such document is decided on a "case by case basis" depending upon the circumstances of the transaction.

Document Management Systems (DMS)

Brokers, lawyers, and other closing professionals are increasingly relying on document and transaction management systems to electronically create, store, share, and organize legal documents.

Machine learning is a branch of artificial intelligence concerned with the design and development of algorithms that enable computers to make predictions about new instances based on historical data concerning similar instances. When the relevant historical data has been labeled (that is, it has known attributes and classifications), the process of predicting the classification of new instances using computers is known as supervised machine learning.

A supervised learning algorithm analyzes the historical (or training) data and produces a function, called a classifier, which predicts the classification of new data. For example, the training data may consist of training instances, each with known attributes ($A_1, A_2, \ldots A_i$) and a known classification $C_1$ or $C_2$ (in the case of a two-class problem). The derived classification rules are subsequently tested and evaluated with an independent test data set.

Supervised machine learning is used, for example, to predict: potential loan defaults, user selection of web pages, online purchasing behavior, medical diagnoses, and electricity demand. In the litigation field, supervised machine learning has been used to predict the outcome of construction litigation. (See "*Universal Prediction Model for Construction Litigation*" Journal of Computing in Civil Engineering, May/June 2009 at page 178).

Supervised machine learning has been invoked as a tool to help complete existing form templates by suggesting values for certain form fields. The suggested values are based on the values entered in previous fields of the same form as well as patterns derived from examples of previously completed versions of similar forms. (See Hermens and Schlimmer, "*A Machine Learning Apprentice for the Completion of Repetitive Forms*" IEEE Expert: Intelligent Systems and their Applications, vol 9, issue 1 at p. 28 (1994))

An example of a widely used learning algorithm is C4.5, which builds decision trees using top down induction. To construct such a decision tree, an attribute is selected to place at the root node with one branch for every possible value of the attribute. C4.5 chooses the attribute using a heuristic based on the information content of the resulting daughter nodes. The process is repeated recursively for each branch using only those instances that actually reach the branch. If at any time all instances at a node have the same classification, that node forms a leaf. To classify a new instance, it is routed down the tree following the branch at each node which corresponds to its value for the applicable attribute. When a leaf node is reached, it is classified according to the class (or probability distribution) assigned to that leaf. C4.5 is described in Quinlan, J. R. "C4.5: *Programs for Machine Learning*" (1993) (published by Morgan Kaufmann) and in Quinlan, J. R. "*Bagging, Boosting and C4.5*" (2006) (published by the University of Sydney), both of which are incorporated herein by reference.

C4.5 algorithms can generate probability predictions by computing the relative frequency of each class in a leaf. The predictive accuracy of C4.5 decision trees is often improved by the use of one of three ensemble learning algorithms, known in turn as "bagged trees", "boosted trees" and "random forests". Each of these algorithms produces multiple decision trees from the same training set. The probability prediction from these ensemble learning techniques is simply the average probability estimate of all the trees in the ensemble.

Other learning algorithms include support vector machines, logistic regression, naïve Bayes, k-nearest neighbor and neural networks. For a complete description of these algorithms, see Witten et al. "*Data Mining—Practical Machine Learning Tools and Techniques*" ($3^{rd}$ ed. 2011) (published by Morgan Kaufmann), which is incorporated herein by reference.

While neural nets, bagged trees and logistic regression make well calibrated predictions, the rest of these learning algorithms (including boosted trees and random forests) either are not designed to predict probabilities or do so poorly. For these algorithms, various calibration methods have been designed to map classification predictions to classification probabilities. For an explanation of two of the leading methods and their application to these algorithms, see Niculescu-Mizil and Caruana, "*Predicting Good Probabilities with Supervised Machine Learning*" (2005) in Proceedings of the $22^{nd}$ International Conference on Machine Learning (pp. 625-632), which is incorporated herein by reference. When calibration is used, the dataset must be divided into three parts: one for learning, one for calibration and one for testing. All of the learning algorithms so far mentioned (after application of the appropriate calibration method) are referred to herein as the "Learning Algorithms".

One of the obstacles to the use of learning algorithms is obtaining sufficient examples to construct, calibrate (if applicable) and test the classifier. An object of the present invention is to create a process that collects sufficient data for learning.

Document production systems that insert customer-specific content into a template are known. For example, in some known systems, a template document is produced using word processing software. The template document is then reviewed and revised by a document developer, and stored in a storage device, such as a disk drive of a computer. An end user then retrieves the template document from the storage device and enters deal specific content in the document. Once the desired content is inserted into specified locations in the document, the document is saved and may be printed or transmitted electronically.

Other document systems may use a relational database to test specific input information against a table of rule sets which, in turn, are directly linked to standard clauses. For example, when working with insurance forms, a rule set may be assigned to insurance policy clauses and insurance endorsement clauses. The insurance policy clauses, endorsement clauses, and rule sets are stored in a database coupled to a main processor. Each rule set includes at least one rule that must be satisfied in order to include the associated clause in the final insurance document. After entering deal specific data into the computer, each rule in each rule set is evaluated to determine whether a particular clause is to be included in the document.

Two recent U.S. patents describe rule-based document generation systems that may be provided as a service, in the sense that the system fits between front-end systems (such as loan origination systems) and existing back-end systems (such as existing printer servers and networks). (See U.S. Pat. No. 7,472,345 B2 and U.S. Pat. No. 8,086,951 B2)

However, these patents, and other existing rule-based document systems, require the creation and manual entry of rules for the selection of documents and clauses; they do not use learning techniques to create or modify rules.

Another recent patent (U.S. Pat. No. 7,296,223) discloses a method for converting a document into a structured document, such as an XML document, and creating a structured document.

However, the disclosed prior art does not disclose or suggest a method, or system, for generating a legal document based upon the refined circumstances of a present legal transaction in light of the circumstances and user selections in previous legal transactions.

BRIEF SUMMARY

In accordance with one embodiment of the present invention, a system and method for generating legal documents is provided.

Some embodiments of the claimed invention accomplish this objective by providing users with reliability rated probabilistic prediction of customary legal documents and clauses as well as document generation and transaction management operations through a DMS as a quid pro quo for the use of the customers' transaction data. Customers provide data about their transactions through a DMS in order to generate and share legal documents. Such transaction data as well as the customers' ultimate selection of legal documents, and optional clauses, are used by a learning agent to construct and test classifiers, which in turn improves the reliability of the system's probabilistic predictions of legal document and clause selection for future users.

Thus, it is also an object of this invention to provide probabilistic prediction of customary legal documents and optional clauses using a combination of expert provided rules, user input and supervised machine learning. Another object of this invention is to provide reliability ratings of such predictions based on experience. Another object of this invention is to enable the selection and generation of commonly used legal documents in those cases not subject to simple decision rules. Yet another object of this invention is to alert the parties to the possible applicability of important legal documents and clauses that are not commonly used and thus might otherwise be overlooked.

In accordance with one embodiment of the present invention a server system for generating legal documents is provided. The server system includes a processor for executing instructions; a display, operatively coupled to the processor; an input communications device; a computer readable medium, operatively coupled to the processor. The computer readable medium contains a set of server system instructions that, if executed by the processor, are operable to cause the server system to prompt a first user to initialize the server system with a plurality of legal document forms and a plurality of form selection attributes corresponding to each of the plurality of legal document forms. The computer readable medium also contains a set of learning agent instructions that, if executed by the processor, are operable to cause the server system to construct at least one machine learned, form selection classifier based on a training set, wherein the training set is a first subset of a set of form usage data. The computer readable medium further contains a set of rule engine instructions that, if executed by the processor, are operable to cause the server system to construct a rules engine, the rules engine comprising form selection rules and resources and logic to apply the form selection rules, wherein the form selection rules include the at least one machine learned, form selection classifier. Also included are a set of document management instructions that, if executed by the processor, are operable to cause the server system to prompt a second user to populate the rules engine with transaction data corresponding to the second user's legal transaction; and, at least one of the plurality of legal document forms as determined by the populated rules engine is selected. The selected legal documents are populated with data corresponding to the transaction data to produce at least one legally binding document once properly executed. The data populating the selected legal documents may be transaction data entered by the second user, data derived from transaction data, or resident system data.

The invention is also directed towards a method for generating legally binding documents. The method includes populating a document management system with a plurality of legal document forms; populating a rules engine system with a plurality of form selection rules wherein each form selection rule maps at least one form selection attribute to at least one of the plurality of legal document forms. Wherein populating the rules engine system with the plurality of form selection rules further comprises predicting a form usage probability for each of the plurality of legal document forms. The method also includes receiving transaction data for a legal transaction and selecting at least one legal document form from the plurality of legal document forms for the legal transaction, by applying at least one form selection rule to the transaction data. The method further includes populating the at least one selected legal document form with data corresponding to the transaction data; and capturing form usage data associated with the selected legal document. The data populating the selected legal documents may be transaction data entered by the second user, data derived from transaction data, or resident system data.

The invention is also directed towards a method for generating legal documents. The method includes populating a document management system with a plurality of legal document forms and a plurality of optional clauses corresponding to at least one of the plurality of legal document forms. The method also populates a rules engine system with a plurality of form selection rules, wherein populating the rules engine system with a plurality of form selection and optional clause selection rules further comprises the rules engine predicting a usage probability for each of the plurality of legal document forms and clauses. Transaction data is received for a current transaction, wherein the transaction data includes at least one user inputted form selection attribute and at least one user inputted clause selection attribute; and based upon the rules engine probabilistic determination for the current transaction at least one legal document is selected. If required, and based upon the rules engine probabilistic determination for the current transaction an optional clause is also determined. The method populates the selected legal document form with the selected optional clause and with data corresponding to the transaction data. The data populating the selected legal documents may be transaction data entered by the second user, data derived from transaction data, or resident system data. The method also captures usage data and metrics associated with the selected legal document and the selected optional clause to reiteratively revise usage probabilities.

BRIEF DESCRIPTION OF THE DRAWINGS

FIG. 1B is a block diagram of an embodiment of the computing device 110 in accordance with the invention shown in FIG. 1A;

FIG. 1C is a block diagram of an embodiment of server 132 in accordance with the invention shown in FIG. 1A;

FIG. 2 is a flowchart of one method of inputting initial selection rules in accordance with the invention shown in FIG. 1A;

DETAILED DESCRIPTION

Figure 1A:
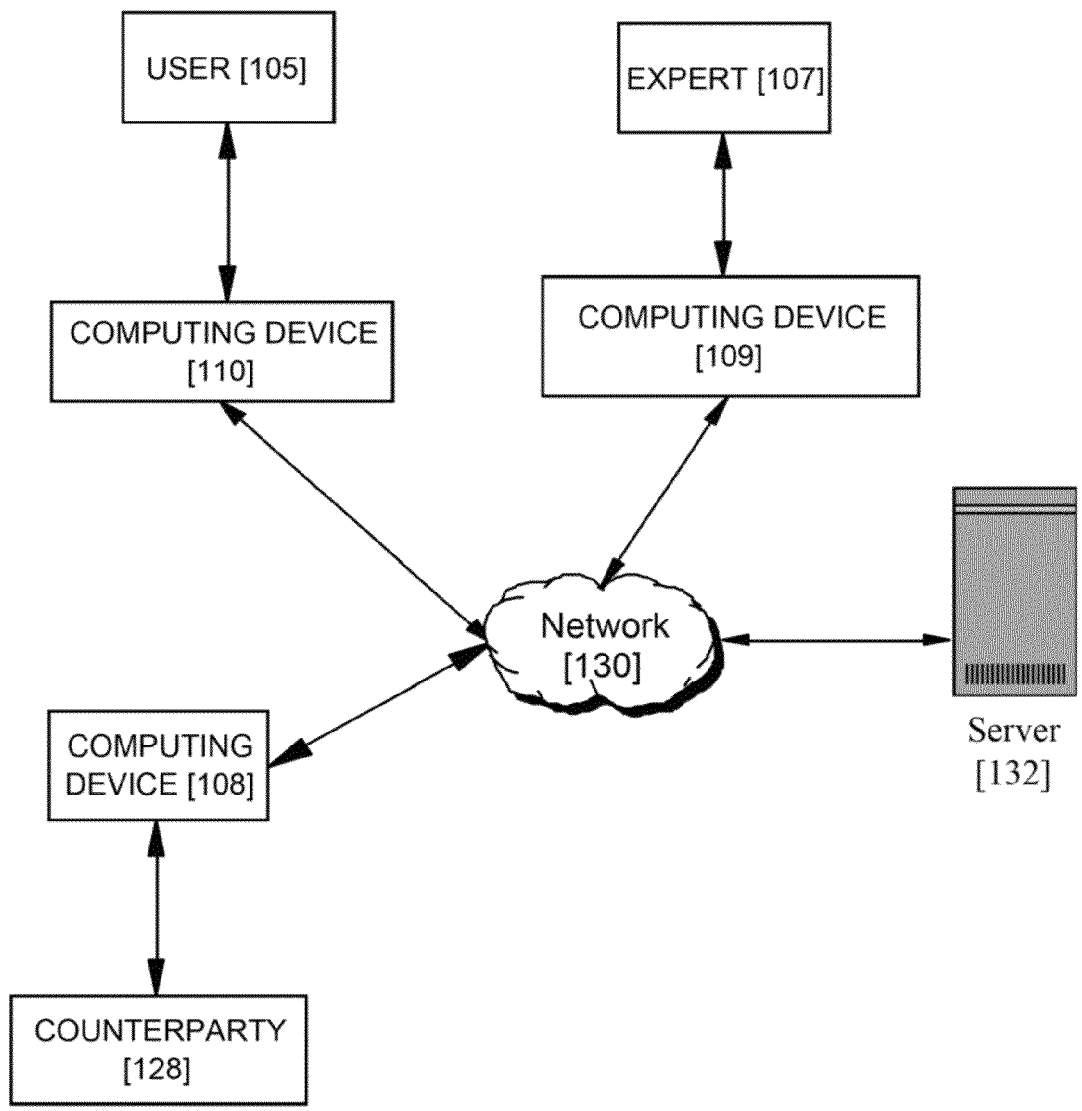
FIG. 1A is a block diagram of a system configuration in accordance with an embodiment of the present invention.

Turning to the drawings, FIG. 1A is a block diagram of a system configuration of an embodiment of the present invention. System 100 may include a variety of computing devices connected via a network 130 to a server 132. Network 130 may be the Internet, a Local Area Network (LAN), a wireless network (such as a wireless LAN or WLAN), or other network, or a combination of networks. System 100 includes server 132, and numerous computing devices, such as a computing devices 108, 109 and 110, each of which are connected via network 130 to server 132. User 105 is party to a transaction (such as a buyer, seller, borrower, or lender) or a representative of such party. User 105 operates computing device 110 to access server 132 through network 130. Counterparty 128 is a counterparty to the transaction in which user 105 is engaged. Counterparty 128 operates computing device 108 to access server 132 through network 130. Expert 107 is an expert in the relevant domain. Expert 107 operates computing device 109 to access server 132 through network 130. It will be appreciated that any suitable device for accessing server 132 may be used.

Referring also to FIG. 1B there is shown a block diagram of computing devices 108, 109, and 110. Computing device 110 employs peripheral components interconnect (PCI) local bus architecture. Although the depicted example employs a PCI bus, any suitable bus architectures such as Accelerated Graphics Port (AGP) and Industry Standard Architecture (ISA) may be used. Processor 111 and main memory 113 are connected to PCI local bus 124 through PCI bridge 112.

Main memory 113 may include read only memory (ROM) and random access memory (RAM). A basic input/output system (BIOS) containing the basic routines that help to transfer information between elements within computing device 110 such as during start-up, may be stored in ROM. PCI bridge 112 also may include an integrated memory controller and cache memory for processor 111. Additional connections to PCI local bus 124 may be made through direct component interconnection or through add-in boards.

In the depicted example, LAN adapter 123, SCSI host bus adapter 116, and expansion bus interface 120 are connected to PCI local bus 124 by direct component connection. It will be understood that LAN adapter 123 may also include an internet browser. LAN adapter 123 may provide a connection through a local area network to network 130. Expansion bus interface 120 provides a connection for keyboard and mouse adapter 121 and modem 122. Modem 122 may also provide a connection to network 130. SCSI host bus adapter 116 provides a connection for hard disk drive 117, tape drive 118, and CD-ROM drive 119. Typical PCI local bus implementations will support PCI expansion slots or add-in connectors.

A user may enter commands and information into computing device 110 through a keyboard and mouse connected to keyboard and mouse adapter 121. Other input devices (not shown) include a touch screen or touch-sensitive device and a microphone, which may be connected to processor 111 by expansion bus interface 120 or other interface such as a universal serial bus. A monitor 115 or other display device is also connected to PCI local bus 124 via an interface such as video adapter 114.

An operating system runs on processor 111 and is used to coordinate and provide control of various components within computing device 110. The operating system may be any suitable commercially available operating system. In addition, an object oriented programming system such as Java may run in conjunction with the operating system and provide calls to the operating system from Java programs or applications executing on computing device 110. "Java" is a trademark of Sun Microsystems, Inc. Instructions for the operating system, the object-oriented programming system, and applications or programs are located on storage devices, such as hard disk drive 117, and may be loaded into main memory 113 for execution by processor 111.

Each of computing devices 108 and 109 may also be a computer as depicted in FIG. 1B. However, the depicted example in FIG. 1B and above-described examples are not meant to imply architectural limitations. For example, one or more of computing devices 108, 109 and 110 may be a notebook computer, smart phone, tablet computer, or hand held computer in addition to taking the form of a PDA.

Referring also to FIG. 1C there is shown a block diagram of an embodiment of server 132. Processor 133 and main memory 135 are connected to system bus 139 through PCI bridge 134. Main memory 135 may include read only memory (ROM) and random access memory (RAM). Additional connections to system bus 139 may be made through direct component interconnection or through add-in boards. In the depicted example, SCSI host bus adapter 138, display 136, input device 137 and communication interface 143 are connected to system bus 139 by direct component connection. SCSI host bus adapter 138 provides a connection for hard disk drive 140, tape drive 141, and CD-ROM drive 142.

Server 132 may run any suitable server operating system and may run a variety of server applications including a database server. Document Generation System 150 runs on Server 132. Various forms of computer-readable media may be involved in carrying one or more sequences of one or more instructions to processor 133 for execution. For example, instructions for the operating system, the server applications and Document Generation System 150 are located on storage devices, such as hard disk drive 139, and may be loaded into main memory 135 for execution by processor 133.

Document Generation System 150 includes Document Management System (DMS) 160, Learning Agent 170 and Rules Engine 180 (a probability and rules engine), each of which may include a database. Learning Agent 170 may include weka or other open source or commercially available software for implementing the Learning Algorithms.

Rules Engine 180 contains and supplies the selection rules or in the case of the machine learned classifiers makes calls to Learning Agent 170 to run such classifiers. DMS 160 includes logic and resources for eliciting transaction data and approval or disapproval of legal documents. DMS 160 includes a form for each legal document (with all optional clauses) that are not generated by third parties as well as logic and resources for populating such forms with the transaction data. DMS 160 may also include logic and resources for the digital signing and electronic recording of legal documents. For a description of an online system enabling these document management functions, see U.S. Pat. No. 7,085,735 "System and Method for Conducting the Closing of a Real Estate Sale over a Computerized Network". Document Generation System 150 and each of its components may be implemented as a combination of scripts and/or programs written in any suitable programming and/or scripting languages.

Still referring to FIG. 1A-FIG. 1C, user 105 operating computing device 110 accesses DMS 160 through network 130. Counterparty 128 operating computing device 108 accesses DMS 160 through network 130. Expert 107 operating computing device 109 accesses DMS 160 through network 130. In one embodiment, DMS 160 is accessed via the Internet through one or more suitable internet browsers. In another embodiment, DMS 160 is accessed through the Internet using a client side application. Additionally, DMS 160 may require each user to register or log in.

Document Generation System 150 generates legal documents through system 100 by receiving inputs from the communication interface 143 and processing such inputs in response to processor 133 executing one or more sequences of one or more instructions contained in main memory 135. Such instructions may be read into main memory 135 from another computer-readable medium, such as hard disk drive 140. Execution of the sequences of instructions contained in main memory 135 causes processor 133 to perform the methods described herein. One or more processors in a multi-processing arrangement may also be employed to execute the sequences of instructions contained in main memory 135.

Those of ordinary skill in the art will appreciate that the hardware in FIGS. 1A, 1B and 1C may vary depending on the implementation. As to FIGS. 1A and 1B, other internal hardware or peripheral devices, such as flash memory cards, equivalent nonvolatile memory, digital video disk, storage area networks, or optical disk drives and the like, may be used in addition to or in place of the hardware depicted therein. Server 132 may consist of any suitable number of servers.

System Operation

The novel probabilistic methods shown in FIG. 2-FIG. 7 are embodied by system 100 to generate legal documents based upon the refined circumstances of a present legal transaction in light of circumstances of previous legal transactions.

Initializing Selection Rules

Referring also to FIG. 2, at step 210, for each transaction type Document Generation System 150 elicits from expert 107 legal documents as well as a set of attributes relevant to the selection of each such document. Examples of transaction types include: real estate sales, real estate financing, business assets sale, stock sale, and international trade transactions.

Expert 107 inputs information through computing device 109 via network 130 into a database in Document Generation System 150 that may be accessed by DMS 160, Learning Agent 170 and Rules Engine 180. As to each attribute, the expert specifies whether the static attribute has numeric or nominal values; if nominal the expert specifies the possible nominal values and if numeric, any restriction on the range of potential numeric values. For example, the attributes in a real estate sale might consist, among other things, of the location of the property (by state), the purchase price, the current use of the property, the size of the property in acres, the type of seller (whether resident, non-resident alien, U.S. entity or foreign entity), and the type of buyer.

The selection of one type of legal document (or clause) may preclude the selection of another type of legal document (or clause). For example, in the case of a real estate sale, the selection of a quitclaim deed would typically preclude the selection of a warranty deed. Thus, a dynamic rule for the probability of a deed type selection may be applied in real time based upon the document's mutual exclusiveness with other deed types.

Still referring to FIG. 2, step 220, for each legal document, Document Generation System 150 prompts from expert 107 a list of optional clauses, or subclauses, along with attributes (and possible default values) relevant to the selection of such optional clauses (or subclauses).

Referring to FIG. 2, step 230, Document Generation System 150 determines whether there are any further subclauses to enter. If so, the process returns to step 220; if not, the process continues at step 240. In one embodiment, each legal document is organized in a tree structure where the title or type of the legal document constitutes the root node and the optional clauses form the daughter nodes depending from the root node. The optional subclauses of a clause form the daughter nodes depending from the parent clause. The most subordinate subclause in each potential path forms a leaf node. To determine whether there are any further subclauses to enter, Document Generation System 150 checks each branch to see if a leaf node has been reached in which case no further subclauses remain.

At step 240, Document Generation System 150 asks expert 107 to input selection rules. Where practical, the domain expert inputs to Rules Engine 180 either a decision table or rule of thumb for the selection of a document or clause based on the values of the attributes. The decision tables and rules of thumb together constitute the initial selection rules upon which Rules Engine 180 selects documents and clauses as customary based on the applicable set of attribute values. When sufficient examples have been collected for training, Learning Agent 170 will construct classifiers, test them against the existing rules and replace outperformed rules with the best performing classifier. For convenience, the term "selection rule" sometimes refers to the applicable selection function—whether rule or classifier. A selection rule may be positive—that is it calls for the inclusion of such document or clause—or negative—calling for the exclusion of such document or clause. It will also be appreciated that the classifier is a continuous updating process such that as laws or rules change the classifier will update the selection function accordingly.

Rules of thumb provide applicable default classification with or without exceptions. A rule of thumb may select a subset of the legal documents based on the value of one or more attributes. Thus, an expert may identify a subset of the legal documents as being customary in the sale of residential real estate in California. In this event, if a user selects real estate sale as the transaction type, indicates California as the location of the property and identifies the property type as residential, the selection rule would select the applicable documents necessary to "close" the transaction. Alternatively, a rule of thumb may apply to only one document or clause. In cases where no simple rule of thumb applies, expert 107 may provide the applicable selection rule in the form of a decision table based on the values of one or more attributes. For certain legal documents and clauses and in an alternative embodiment, no decision table or rule of thumb is provided. Instead, the initial selection rule for each of these documents will automatically classify the document (and all optional clauses) as customary.

Referring to FIG. 2, step 250, Rules Engine 180 assigns a low, medium or high reliability rating to each selection rule mapped to the documents or clauses selected or excluded by the selection rule. For example, documents and clauses selected (or excluded) by a selection rule with a low reliability rating inherit the selection rule's low reliability rating (for purposes of that selection or exclusion only). It will be appreciated that the reliability ratings may be any suitable rating, such as, for example, a percentage or a numerical rating.

When a selection rule is based on a fully populated decision table provided by a domain expert, Rules Engine 180 initially assigns a default high reliability rating to that selection rule. When the selection rule is based on an expert provided rule of thumb, such selection rule is assigned a default medium reliability rating. In an alternate embodiment, the expert may revise these default reliability ratings, but in any case, Rules Engine 180 will adjust the reliability rating functions based on experience as described below. Where no rule of thumb or decision table is provided the initial selection rule has a low reliability rating.

Generating Default Legal Documents

Figure 3:
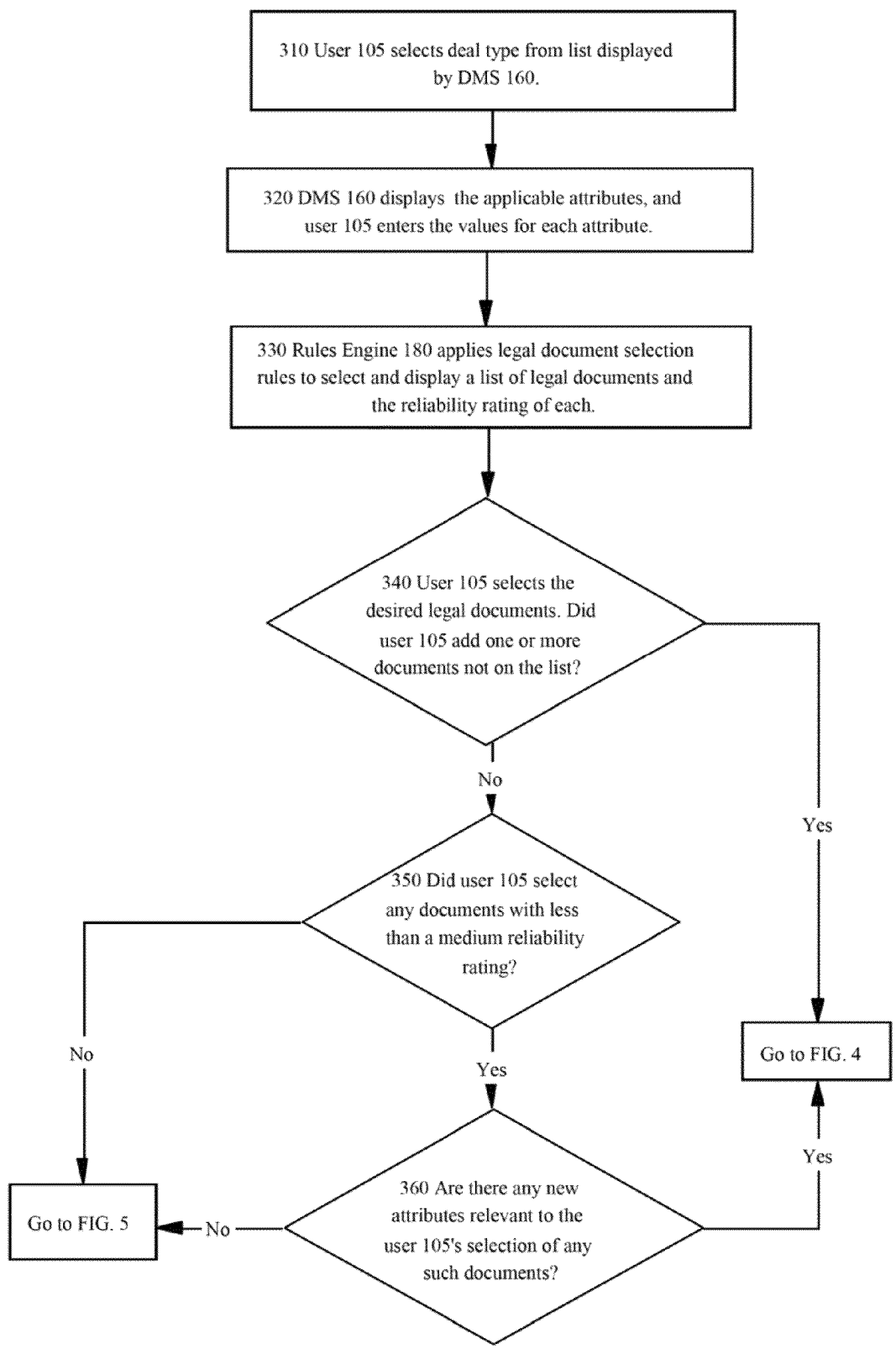
FIG. 3 is a flowchart of one method for legal document selection function in accordance with the invention shown in FIG. 1A.

Referring to FIG. 3, at Step 310 user 105 operating computing device 110 accesses DMS 160 through network 130. It will be appreciated that access may be approved or allowed by any suitable method such as, for example, password or biometric methods. Once user 105 obtains access, DMS 160 displays the list of selectable transaction types.

To construct a legal document for a legal transaction, DMS 160 begins at the root node (document title) and follows the path of each optional clause and subordinate clauses selected by user 105 until a leaf node is reached. Any clause or subclause not selected by user 105 is excluded.

In one embodiment, as to the selection of legal documents for a transaction, the relevant dataset for training, calibration and testing consists of all instances for the applicable transaction type where each instance is an array consisting of the values of each relevant attribute and the classification (typically either included or excluded) of the legal document.

For the selection of optional clauses, the relevant dataset consists of those instances where the applicable legal document was selected and where each instance is an array consisting of the values of each relevant attribute (for selection of such clause) and the classification (typically included or excluded) of such clause.

For the selection of an optional subclause, the relevant dataset consists of those instances where the optional clause occupying the parent node of such subclause was selected and where each instance is an array consisting of the values of each relevant attribute (for selection of such subclause) and the classification (typically included or excluded) of such subclause. In each case, the relevant dataset is partitioned for training, calibration and testing as described below.

Still referring to FIG. 3, Step 320, based on the transaction type, DMS 160 prompts from user 105 the value of each attribute for the applicable transaction. Certain of these attribute values may already have been input into DMS 160. In this case, DMS 160 will retrieve the relevant transaction data from storage. At Step 330, Rules Engine 180 applies the stored selection rules to generate a list of prioritized legal documents along with the reliability rating for each legal document based on the reliability rating of the applicable selection rule. As noted earlier, the reliability rating denotes the level of certainty that the document is (or is not) customarily used. In one embodiment, excluded documents and applicable reliability ratings may be displayed. It will be appreciated that displaying excluded documents reminds user 105 of uncommon, but potentially important, documents.

The listed documents (other than those that are prepared by third parties) are linked to electronic forms stored in DMS 160. Information required to complete the electronic forms is prompted from user 105 at step 320. Each electronic form includes all optional clauses and subclauses according to the previously entered attributes and selection rules.

At Step 340, user 105 selects the desired legal documents for the transaction. User 105 may have the option of adding a document. If user 105 adds one or more documents the process continues on FIG. 4. If user 105 does not add documents, then the process continues at step 350. At step 350, DMS 160 determines whether or not user 105 or Rules Engine 180 chose any documents with a low reliability rating. If not, the process proceeds to FIG. 5. If so, at step 360 user 105 is queried by system 100 whether any attributes unknown by system 100 were relevant to user 105's selection of any such document. If user 105 responds in the negative, the process proceeds to FIG. 5; if in the affirmative, then the process proceeds to FIG. 4.

Figure 4:
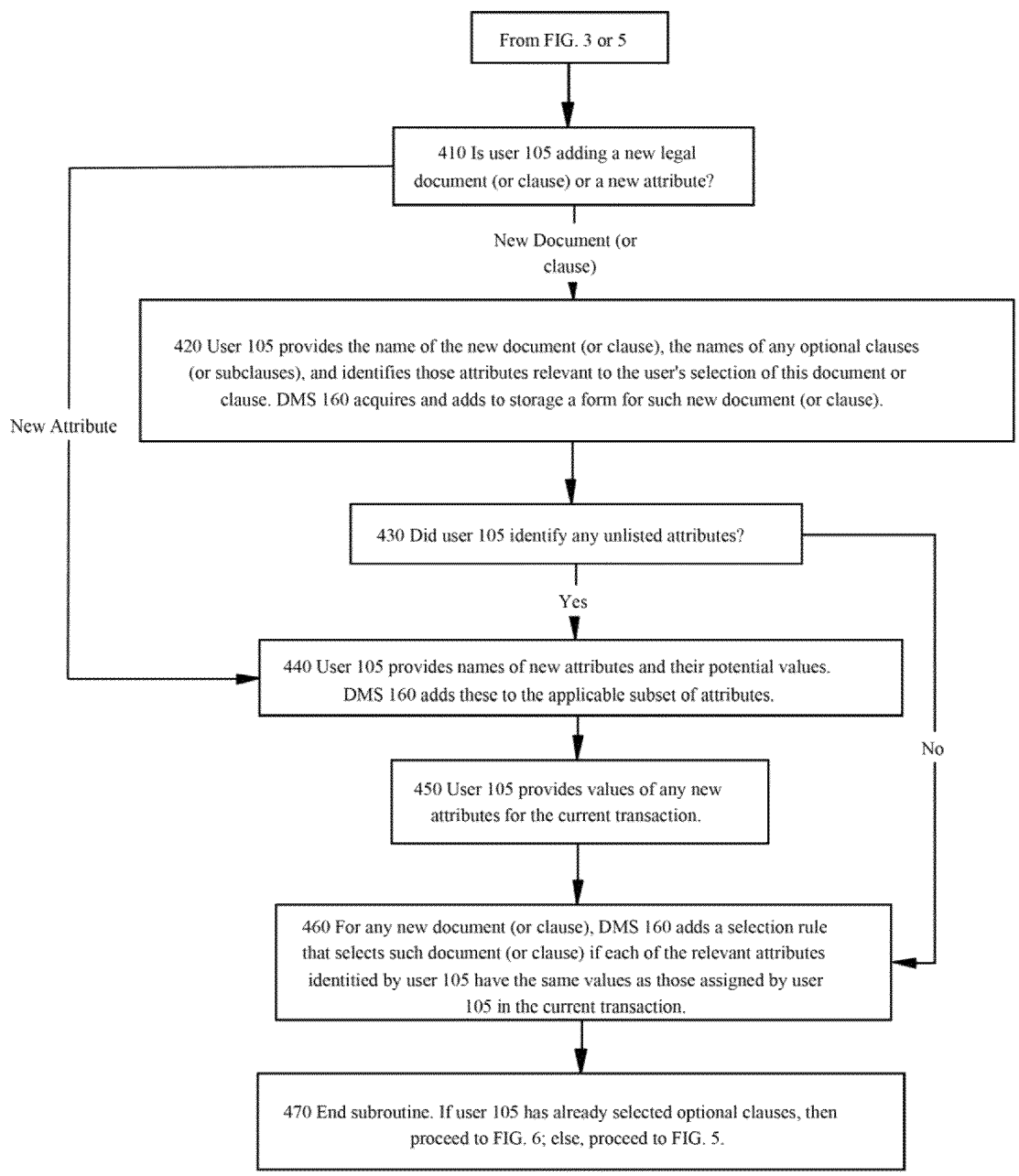
FIG. 4 is a flowchart of one method for adding new legal documents and attributes in accordance with the invention shown in FIG. 1A.

Referring to FIG. 4, at step 410, if user 105 is adding a new document (or clause) then the process continues at step 420; if instead user 105 is adding an attribute then the process continues at step 440. At step 420, DMS 160 prompts from user 105 the title of the new document (or clause) and the names of its optional clauses (or subclauses), if any.

DMS 160 prompts from user 105 form fields defining the new document (or optional clause) and adds the same to the set of electronic document forms. As with all other electronic forms stored in DMS 160, such form shall include logic and resources for populating the form with transaction data. DMS 160 also prompts from user 105 the attributes (new or existing) relevant to user 105's selection of the new document or clause. It will be appreciated that user 105 may designate each attribute or group of attributes that were sufficient to justify adding the new document to the present transaction.

Still referring to FIG. 4, step 430, if user 105 did not identify any new attributes, then the process continues at step 460; if user 105 did identify any new attributes, then the process continues at step 440. At step 440, DMS 160 prompts from user 105 the names of the new attributes and potential values. DMS 160 adds the new attributes and potential values to the applicable subset of attributes. At step 450, DMS 160 prompts from user 105 the values of any new attributes for the current transaction. At step 460, for any new document (or clause) DMS 160 adds to Rules Engine 180 a selection rule that selects such document (or clause) if each of the relevant attributes identified by user 105 have the same values as those assigned by user 105 in the current transaction. At step 470, if user 105 has already selected optional clauses, then the process continues on FIG. 6; else, the process continues on FIG. 5.

Figure 5:
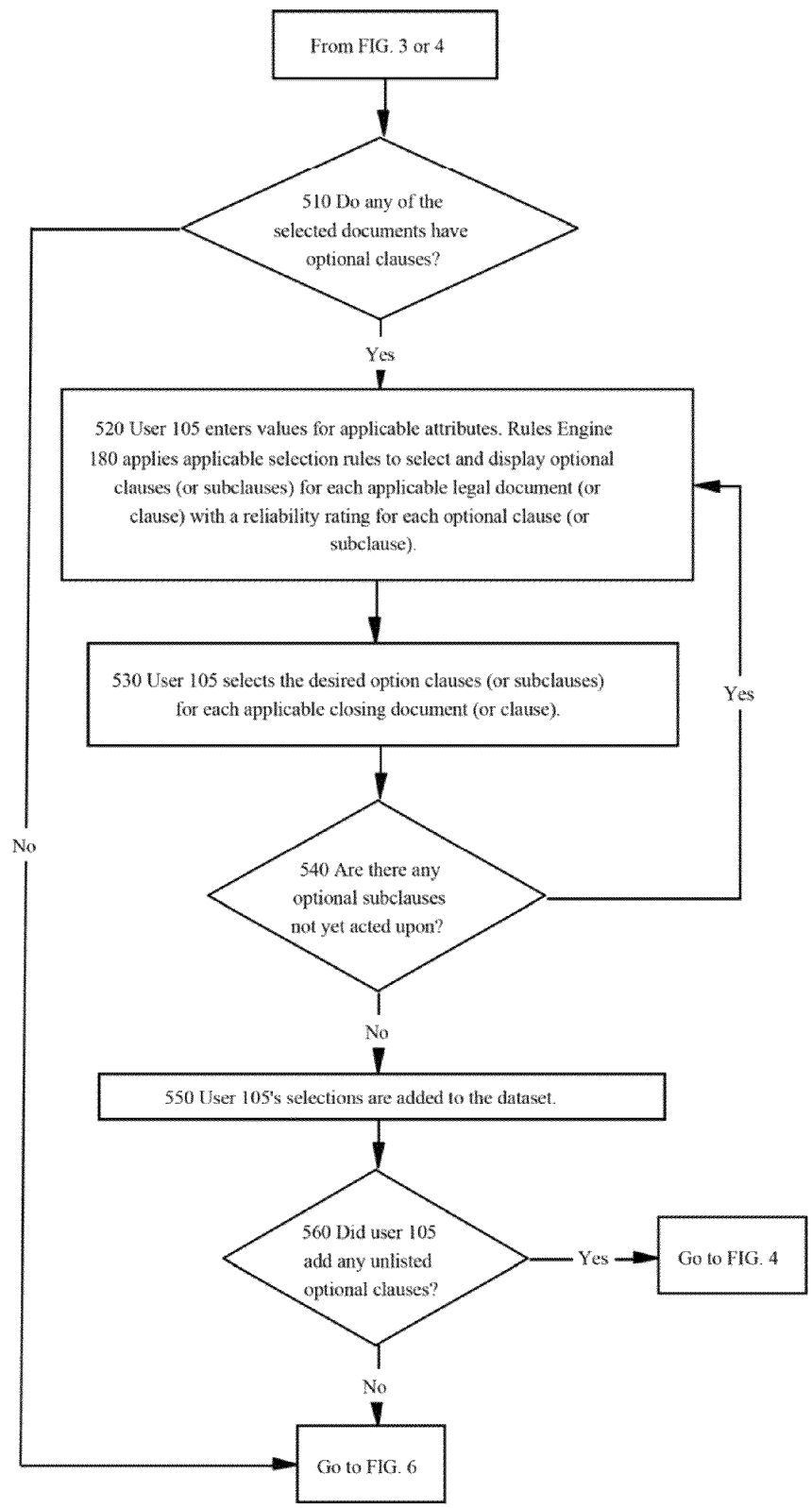
FIG. 5 is a flowchart of one method for a clause selection function in accordance with the invention shown in FIG. 1A.

Referring to FIG. 5, at Step 510, DMS 160 determines whether any of the selected documents have any optional clauses. If yes, the process continues at step 520; if not, the process continues on FIG. 6. At step 520, DMS 160 prompts user 105 to enter values for the applicable attributes for each optional clause (or subclause) for each applicable document (or clause). For each document, Rules Engine 180 applies the selection rules to the attribute values to determine and display the customary optional clauses with a reliability rating for each. At step 530, user 105 selects the desired clauses (or subclauses). At Step 540, DMS 160 checks to determine whether there are any optional subclauses not yet acted upon.

DMS 160 confirms the parent-child path of each optional clause and subclause selected by user 105 to determine whether any such path has not yet reached a leaf or terminal node. The process continues recursively until each path reaches a leaf node. Once a leaf node is reached, the process continues at Step 550.

Still referring to FIG. 5, step 550, user 105's selections are added to the dataset. In one embodiment, this process is accomplished by following the tree structure for the applicable document down each branch leading to a selected optional clause or subclause until a leaf node is reached. For each node in each path taken down the tree, the applicable clause or subclause is included in the selected document; all other clauses and subclauses are excluded. At step 560, DMS 160 determines whether user 105 added any unlisted optional clauses. If so, the process continues on FIG. 4; if not, the process proceeds to FIG. 6.

Figure 6:
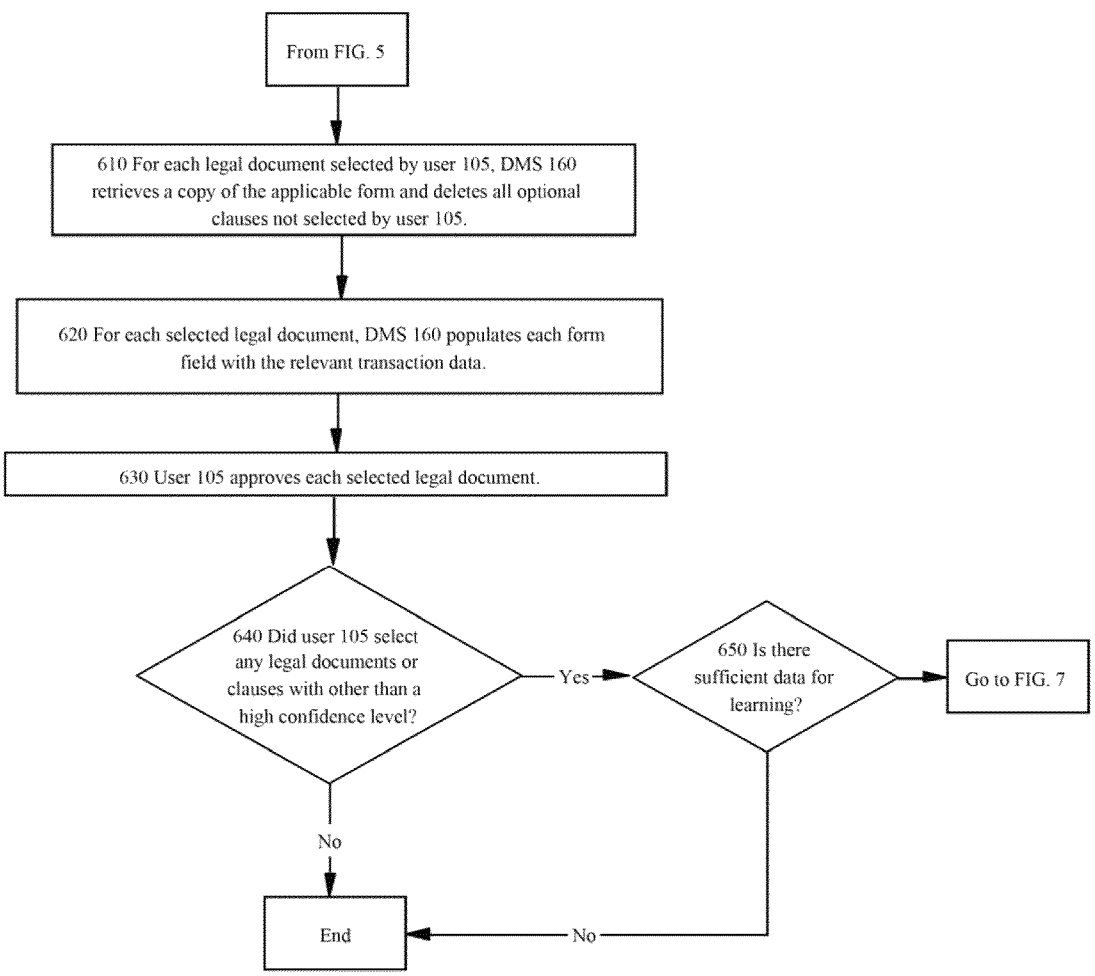
FIG. 6 is a flowchart of for one method of legal document generation function in accordance with the invention shown in FIG. 1A.

Referring also to FIG. 6, at step 610 for each document selected by user 105, DMS 160 retrieves a copy of the applicable electronic form from its electronic form set and deletes all optional clauses not selected by user 105. At step 620, for each selected document having a corresponding electronic form, DMS 160 populates each form field with the relevant transaction data. At step 630, DMS 160 makes the completed form available to user 105 for final approval.

In one embodiment, user 105 and counterparty 128 (and any other parties to the transaction) may edit the text of (and provide final approval of) each document by accessing DMS 160 through computing device 108 (as to counterparty 128), computing device 110 (as to user 105) or any other computing device connected to server 132 through network 130. In yet another embodiment, DMS 160 may enable the digital signing of each document by user 105, counterparty 128 and any other parties to the transaction.

At step 640, if user 105 selected any documents or clauses with other than a high reliability rating, the process continues at step 650; if not the process ends. At Step 650, DMS 160 determines whether the dataset contains a default number of examples for learning machine learned selection rules. If there is sufficient data for learning, then the process continues on FIG. 7; if not, the process ends.

Learning which Legal Documents and Clauses are Customary

Figure 7:
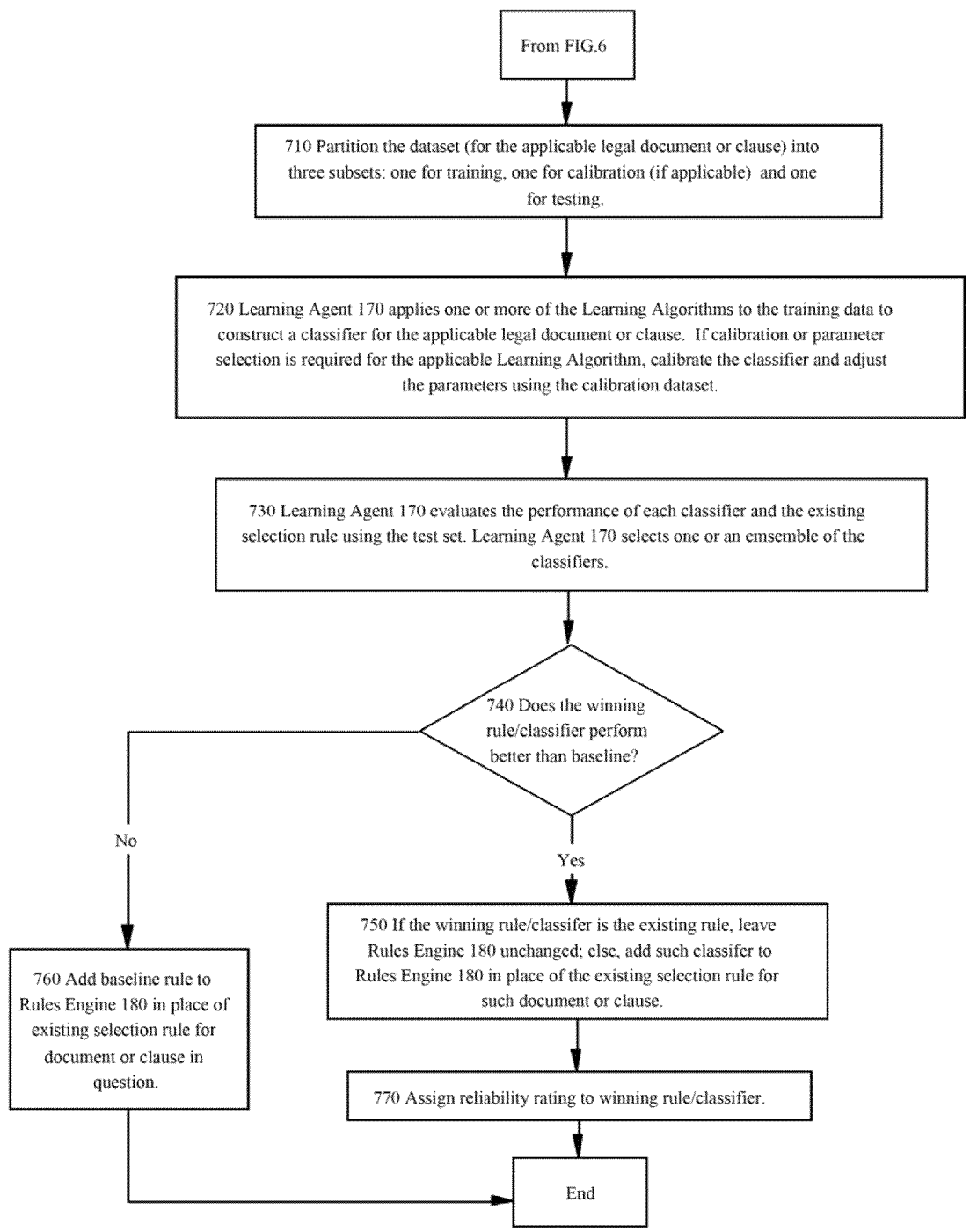
FIG. 7 is a flowchart of one method of the learning function in accordance with the invention shown in FIG. 1A.

Referring also to FIG. 7, at Step 710, for each decision (whether document or clause selection for a given transaction type in a given jurisdiction) for which there is sufficient data, Learning Agent 170 partitions the dataset for training, calibration and testing. The partition method used will depend on the size of the dataset. For example with a large dataset, Learning Agent 170 may use stratified 10-fold cross-validation. On a small dataset, Learning Agent 170 may use 0.632 bootstrap or any other suitable partitioning method.

Learning Agent 170 may also apply an attribute selection method in order to eliminate irrelevant or redundant attributes for the document or clause in question. There are two basic approaches to attribute selection: the filter method which uses heuristics based on general characteristics of the data and the wrapper method in which learning algorithms are used to evaluate possible subsets of the data.

Still referring to FIG. 7, step 720, Learning Agent 170 applies one or more Learning Algorithms to the training data to learn a set of probability estimates for each possible document or clause in question. In one embodiment, Learning Agent 170 uses stacking to combine the classification probabilities predicted by multiple Learning Algorithms. In such case, the meta-learner constructed by stacking is included within the set of Learning Algorithms.

Learning Agent 170 may also employ multiple Learning Algorithms independently to determine which Learning Algorithm more accurately predicts use of the applicable document or clause.

Learning Agent 170 cleanses the training data by discarding instances that are misclassified by all of the Learning Algorithms and repeats the learning process on the cleansed training set. Finally, if the applicable Learning Algorithm requires calibration, or parameter selection, the appropriate calibration or parameter selection method is used on the applicable part of the dataset.

Still referring to FIG. 7, at step 730, Learning Agent 170 evaluates the performance of each classifier (as well as that of the existing selection rule) using an appropriate test for measuring error, which may be the quadratic loss function, the informational loss function or any suitable test, or a combination thereof using normalized scores. For example, a combination of performance metrics are applied and the scores of each are normalized on a scale of 0 to 100 where 0 is baseline performance and 100 is the best performance by any classifier on the applicable test. Baseline performance for the positive selection rule is the performance of a model which in each case estimates the probability of selection of the given clause or form as being equal to the percentage of positive selections of such form or clause in the training set.

Learning Agent 170 compares the performance metric for each classifier and the existing selection rule and selects the one with the best performance. Learning Agent 170 may determine the statistical significance of differences between performance metrics using t-tests or other appropriate statistical tests and modify the existing selection rule accordingly. Learning Agent 170 may modify an existing expert rule if the rule is outperformed by one of the classifiers by a predetermined statistically significant margin plus a preset fixed percentage bias.

At step 740, Learning Agent 170 determines whether the winning classifier (or selection rule) performs better than baseline. If so, the process continues at step 750; if not, the process continues at step 760. At step 760, since no classifier/selection rule outperformed the baseline rule, the baseline selection rule is added to Rules Engine 180 in place of the existing selection rule for such document (or clause).

Still referring to FIG. 7, step 750, if the winning test is other than the existing selection rule, it is added to Rules Engine 180 in place of the existing selection rule; otherwise the existing selection rule (as modified by calibration) remains in Rules Engine 180. At step 770, the winning classifier (or rule) is assigned a reliability rating function. For example, the reliability rating function may be as follows:

For the positive selection rule—that is, where such document or clause is selected:
If $P_i - M_i \geq 90\%$, then $R_i$=high
If $90\% > P_i - M_i \geq 75\%$, then $R_i$=medium
Else, $R_i$=low
For the negative selection rule—that is, where such document or clause is not selected:
If $P_i + M_i \leq 35\%$, then $R_i$=high
If $35\% < P_i + M_i \leq 50\%$, then $R_i$=medium
Else, $R_i$=low
Where:
a. $P_i$ is the probability predicted by such classifier for the selection of document or clause i,
b. $M_i$ is the margin of error for such prediction (based on the size of the test set), and
c. $R_i$ is the reliability rating for i.

In one embodiment, the percentages shown above may be adjusted by user 105. In another embodiment, the measure $M_i$ is composed of the margin of error plus a performance-based adjustment. The performance-based adjustment is inversely related to one or an ensemble of the performance metrics applied to such classifier as described above.

The margin of error ($M_i$) depends, among other things, on the required confidence level. For example, assuming a normal distribution and a required confidence level of 95%, based on standard statistics formulas, the margin of error for a sample size of 1000 and an estimated success rate of 75% would be about ±2.6%. In one embodiment, Learning Agent 170 employs a confidence level of 95% and a normal distribution is assumed. In another embodiment, user 105 may set his or her desired confidence level or designate a different distribution.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A server system for generating legal documents, the server system comprising:
  a. processor for executing instructions;
  a display, operatively coupled to the processor;
  an input communications device;
  a non-transitory computer readable medium, operatively coupled to the processor, wherein the non-transitory computer readable medium contains:
    a set of server system instructions that, if executed by the processor, are operable to cause the server system to prompt a first user to initialize the server system with a plurality of legal document forms and a plurality of form selection attributes corresponding to each, of the plurality of legal document forms;
    a set of learning agent instructions that, if executed by the processor, are operable to cause the server system to construct at least one machine learned, form selection classifier based on a training set, wherein the training set is a first subset of a set of form usage data;
    a set of rule engine instructions that, if executed by the processor, are operable to cause the server system to construct a rules engine, the rules engine comprising form selection rules and resources and logic to apply the form selection rules, wherein the form selection rules include the at least one machine learned, form selection classifier; and a set of document management instructions that, if executed by the processor, are operable to cause the server system to:
prompt a second user to populate the rules engine with transaction data corresponding to the second user's legal transaction;
select at least one of the plurality of legal document forms as determined by the populated rules engine;
populate at least one selected legal document form with data corresponding to the transaction data to produce at least one completed legal document; and
display the at least one completed legal document to the second user.

2. The server system of claim 1, wherein the rules engine is configured to perform a comparative evaluation of the form selection rules using a test set, wherein the test set is a second subset of the set of form usage data.

3. The server system of claim 2 wherein the rules engine is configured to assign a reliability rating to each of the form selection rules based on the comparative evaluation of the form selection rules.

4. The server system of claim 3 wherein the set of document management instructions, if executed by the processor, are further operable to cause the server system to:
display a suggested legal document form and its associated reliability rating for the legal transaction, wherein the suggested legal document form and its associated reliability rating are determined by the rules engine; and
add the transaction data and the second user's form selection to the set of form usage data.

5. The server system of claim 4, wherein the machine learned, form selection classifier generates probabilistic predictions of form usage derived from the form usage data and the transaction data.

6. The server system of claim 5, wherein at least one of the form selection rules is dynamic, wherein the dynamic form selection rule references the at least one selected legal document.

7. The server system of claim 6 wherein the form selection rules are initialized with expert provided rules.

8. A method for generating legally binding documents, the method comprising:
populating a document management system with a plurality of legal document forms;
populating a rules engine system with a plurality of form selection rules, wherein populating the rules engine system with the plurality of form selection rules further comprises predicting a form usage probability for each of the plurality of legal document forms;
receiving transaction data for a legal transaction, wherein the transaction data includes at least one form selection attribute;
selecting at least one legal document form from the plurality of legal document forms for the legal transaction, wherein selecting the at least one legal document further comprises applying at least one form selection rule to the transaction data;
populating the at least one selected legal document form with data corresponding to the transaction data; and
capturing form usage data associated with the selected legal document.

9. The method of claim 8 wherein predicting the usage probability for each of the plurality of legal document forms comprises applying at least one machine learning algorithm to construct at least one form selection classifier with a first subset of the form usage data.

10. The method of claim 9 wherein constructing the at least one form selection classifier further comprises testing the at least one form selection classifier with a test set, wherein the test set is a second subset of the form usage data.

11. The method of claim 10 wherein the form usage data is collected in the document management system.

12. The method of claim 11 wherein populating the rules engine with a plurality of form selection rules further comprises testing the plurality of form selection rules with the test set and assigning a reliability rating to each of the form selection rules based on the results of such testing.

13. The method of claim 12 wherein determining the at least one selected legal document form for the legal transaction further comprises: displaying at least one suggested legal document form and its associated form selection rules reliability rating.

14. A method for generating legal documents, the method comprising:
populating a document management system with a plurality of legal document forms and a plurality of optional clauses corresponding to at least one of the plurality of legal document forms;
populating a rules engine system with a plurality of form selection rules, wherein populating the rules engine system with a plurality of form selection rules further comprises the rules engine predicting a usage probability for each of the plurality of legal document forms;
populating the rules engine system with a plurality of clause selection rules wherein each clause selection rule maps at least one clause selection attribute to at least one optional clause, wherein populating the rules engine system with a plurality of clause selection rules further comprises the rules engine predicting a usage probability for each of the plurality of optional clauses;
receiving transaction data for a current transaction, wherein the transaction data includes at least one user inputted form selection attribute and at least one user inputted clause selection attribute;
determining with the rules engine at least one selected legal document form for the current legal transaction;
determining with the rules engine at least one selected optional clause for the at least one selected legal document form; and
populating the at least one selected legal document form with the at least one selected optional clause and with data corresponding to the transaction data; and
capturing usage data associated with the selected legal document and the selected optional clause to reiteratively revise usage probabilities.

15. The method of claim 14 wherein predicting, the usage probability for each of the plurality of optional clauses comprises applying at least one machine learning algorithm to construct at least one clause selection classifier with a first subset of the clause usage data.

16. The method of claim 15 wherein constructing the at least one clause selection classifier further comprises testing the at least one clause selection classifier using a test set, wherein the test set is a second subset of the clause usage data.

17. The method of claim 16 wherein the set of clause usage data is collected in the document management system.

18. The method of claim 17 wherein populating the rules engine with a plurality of clause selection rules further comprises testing the plurality of clause selection rules with the test set and assigning a reliability rating, to each of the clause selection rules based on the test results.

19. The method of claim 18 wherein the at least one selected optional clause contains a plurality of subordinate optional clauses.

20. The method of claim 19 wherein the at least one selected optional clause and the plurality of subordinate optional clauses are organized in a tree structure.

\* \* \* \* \*